(12) United States Patent
Gallucci et al.

(10) Patent No.: US 7,932,310 B2
(45) Date of Patent: Apr. 26, 2011

(54) FLAME RETARDANT POLYSULFONE BLENDS

(75) Inventors: Robert Russell Gallucci, Mt. Vernon, IN (US); Ganesh Kailasam, Evansville, IN (US); William A. Kernick, III, Evansville, IN (US); Mark Alan Sanner, Newburgh, IN (US); Rajendra Kashinath Singh, Evansville, IN (US)

(73) Assignee: SABIC Innovative Plastics IP B.V. (NL)

( * ) Notice: Subject to any disclaimer, the term of this patent is extended or adjusted under 35 U.S.C. 154(b) by 869 days.

(21) Appl. No.: 11/228,729

(22) Filed: Sep. 16, 2005

(65) Prior Publication Data

US 2007/0066738 A1    Mar. 22, 2007

(51) Int. Cl.
*C08G 18/77* (2006.01)

(52) U.S. Cl. ........ 524/115; 524/413; 524/430; 524/404; 525/418; 525/446; 428/411.1

(58) Field of Classification Search .................. 524/430, 524/115; 525/474
See application file for complete search history.

(56) References Cited

U.S. PATENT DOCUMENTS

| | | | |
|---|---|---|---|
| 3,971,755 A * | 7/1976 | Zannucci et al. ............. | 524/175 |
| 4,548,997 A | 10/1985 | Mellinger et al. ............ | 525/433 |
| 4,687,819 A | 8/1987 | Quinn et al. .................. | 525/425 |
| 4,816,527 A | 3/1989 | Rock ............................. | 525/431 |
| 4,833,190 A * | 5/1989 | Cella et al. .................... | 524/405 |
| 4,908,418 A | 3/1990 | Holub ............................ | 525/425 |
| 4,908,419 A | 3/1990 | Holub et al. ................... | 525/425 |
| 5,051,483 A | 9/1991 | Rock et al. .................... | 525/425 |
| 5,106,915 A | 4/1992 | Rock et al. .................... | 525/431 |
| 5,204,400 A | 4/1993 | Kelly et al. .................... | 525/405 |
| 5,387,639 A | 2/1995 | Sybert et al. .................. | 524/537 |
| 5,521,258 A | 5/1996 | Cooper et al. ................. | 525/425 |
| 5,986,016 A | 11/1999 | Puyenbroek et al. ......... | 525/420 |
| 6,011,122 A | 1/2000 | Puyenbroek .................. | 525/425 |
| 6,072,010 A | 6/2000 | Puyenbroek .................. | 525/425 |
| 6,310,145 B1 * | 10/2001 | Puyenbroek et al. ......... | 525/431 |
| 6,482,880 B1 | 11/2002 | Rock ............................. | 524/405 |
| 6,627,303 B1 * | 9/2003 | Gallucci et al. ............... | 428/212 |
| 2002/0123566 A1 * | 9/2002 | Georgiev et al. .............. | 525/66 |

FOREIGN PATENT DOCUMENTS

| | | |
|---|---|---|
| EP | 0535785 | 4/1993 |
| EP | 0 307 670 B1 | 9/1994 |
| JP | 07188545 | 7/1995 |
| JP | 2001146590 | 5/2001 |

OTHER PUBLICATIONS

U.S. Appl. No. 10/828,954, filed Jun. 28, 2004, Gallucci et al.

* cited by examiner

*Primary Examiner* — Vasu Jagannathan
*Assistant Examiner* — Doris L Lee
(74) *Attorney, Agent, or Firm* — Diderico van Eyl; Novak Druce + Quigg LLP

(57) ABSTRACT

Blends of polysulfones, polyethersulfones and polyphenylene ether sulfones with resorcinol based polyesters, or resorcinol based polyester carbonate polymers, and silicone copolymers have improved flame resistance. Peak heat release energy is reduced and the time to reach peak heat release is increased.

12 Claims, No Drawings

FLAME RETARDANT POLYSULFONE BLENDS

FIELD OF THE INVENTION

This invention relates to blends of polysulfones, polyethersulfones and polyphenylene ether sulfones with resorcinol based polyesters, or resorcinol based polyester carbonate polymers, and silicone copolymers having improved flame resistance.

BACKGROUND OF THE INVENTION

There has long been interest in developing thermoplastic resins that can resist burning. A specific area of concern is in developing plastics for transportation applications, such as rail cars and airplanes. Various evaluation techniques have been developed to test the effectiveness of such materials, for instance Federal Aviation Regulation (FAR) 25.853. In this test, sometimes referred to as the Ohio State University (OSU) rating, the time for a sample to reach peak heat release, the amount of energy released after 2 minutes and the peak heat release energy are measured. Lower heat release values and longer time to reach peak heat release are desirable. This is a demanding test designed to give some idea of the amount of time passengers would have to escape from a vehicle in the event of a fire, however it is not a replacement for device testing in end use applications nor is it a guarantee of performance in actual fire conditions. Polymer blends that have been used in these applications are described, for example, in U.S. Pat. No. 5,051,483. These compositions combine polyetherimides (PEI) with a silicone polyetherimide and a polycarbonate (PC). Despite the effectiveness of these compositions there still exists a need for even better flame resistance performance in this area.

BRIEF DESCRIPTION OF THE INVENTION

We have found a surprising improvement in the flame retardant (FR) performance, and FAR 25.853 rating, of polysulfones, polyethersulfones and polyphenylene ether sulfones blends with silicone copolymers and polycarbonate by making a small change in the polycarbonate structure. Replacement of polycarbonate bisphenol-A derived linkages with resorcinol derived ester linkages gives a very large improvement in heat release even in blends where the resorcinol based polymer is a minor component. Thus blends of polysulfones, polyethersulfones and polyphenylene ether sulfones with silicone copolymers and resorcinol based aryl polyesters show significantly improved FR properties. The blends also exhibit high flexural modulus and high tensile elongation at break. Melt flow of the polysulfone blend is also improved.

DETAILED DESCRIPTION OF THE INVENTION

Combinations of silicone copolymers, for instance silicone polyimides or silicone polycarbonates, with polysulfone (PSu), polyether sulfone (PES) and polyphenylene ether sulfone (PPSU) resins having a high glass transition temperature (Tg>180° C.), in combination with resorcinol derived polyaryl esters have surprisingly low heat release values and improved melt flow. The silicone copolymer can be selected from the group consisting of polyimide siloxanes, polyetherimide siloxanes, polyetherimide sulfone siloxanes polycarbonate siloxanes, polyestercarbonate siloxanes, polysulfone siloxanes, polyether sulfone siloxanes, polyphenylene ether sulfone siloxanes and mixtures thereof. The resorcinol derived aryl polyesters can also be a copolymer containing non-resorcinol based linkages, for instance a resorcinol—bisphenol-A copolyester carbonate. For best effect, resorcinol ester content (REC) should be greater than about 50 mole % of the polymer linkages being derived from resorcinol. Higher REC may be preferred. In some instances REC of greater than 75 mole %, or even as high as 90 or 100 mole % resorcinol derived linkages may be desired.

The amount of resorcinol ester containing polymer used in the flame retardant blend can vary widely using any effective amount to reduce heat release or increase time to peak heat release. In some instances resorcinol ester containing polymer can be from 1 to 50 wt % of the polymer blend. Some compositions of note will have 10-50% resorcinol based polyester. In other instances blends of polysulfones, polyethersulfones and polyphenylene ether sulfones with high REC copolymers will have a polysulfone glass transition temperature (Tg) of about 180° C.

The resorcinol based polyarylate resin should contain at least about 50 mole % of units derived from the reaction product of resorcinol, or functionalized resorcinol, with an aryl dicarboxylic acid or dicarboxylic acid derivatives suitable for the formation of aryl ester linkages, for example, carboxylic acid halides, carboxylic acid esters and carboxylic acid salts.

The resorcinol based polyarylate may further contain carbonate linkages derived from reaction of a bisphenol and a carbonate forming species, such as phosgene, making a polyester carbonate copolymer. In another embodiment of the invention resorcinol polyarylate carbonate copolymers will be comprised of the reaction products of iso and terephthalic acid, resorcinol and optionally, bisphenol A and phosgene. In one aspect the resorcinol polyester carbonate copolymer will be made in such a way that the number of bisphenol dicarboxylic ester linkages is minimized, for example by pre-reacting the resorcinol moiety with the dicarboxylic acid moiety to form an aryl polyester block and then reacting a said block with the bisphenol and carbonate moiety to form the polycarbonate part of the copolymer.

In one of its aspects the composition of the present invention is comprised of polymers containing arylate polyester chain members. Said chain members comprise at least one diphenol residue in combination with at least one aromatic dicarboxylic acid residue. In one embodiment the diphenol residue is derived from a 1,3-dihydroxybenzene moiety, as illustrated in Formula I, commonly referred to throughout this specification as resorcinol or resorcinol moiety. Resorcinol or resorcinol moiety as used within the context of the present invention should be understood to include both unsubstituted 1,3-dihydroxybenzene and substituted 1,3-dihydroxybenzenes unless explicitly stated otherwise.

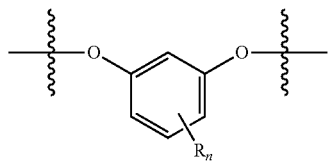

Formula I

In Formula I R is at least one of $C_{1-12}$ alkyl, $C_6$-$C_{24}$ aryl, alkyl aryl, alkoxy or halogen, and n is 0-4.

Suitable dicarboxylic acid residues include aromatic dicarboxylic acid residues derived from monocyclic moieties. In various embodiments suitable dicarboxylic acid residues include those derived from isophthalic acid, terephthalic acid, or mixtures of isophthalic and terephthalic acids. Suitable dicarboxylic acid residues also include those derived from polycyclic moieties, illustrative examples of which include diphenyl dicarboxylic acid, diphenylether dicarboxylic acid, and naphthalenedicarboxylic acid, especially naphthalene-2,6-dicarboxylic acid. In some embodiments the aromatic dicarboxylic acid residues are derived from mixtures of isophthalic and/or terephthalic acids as typically illustrated in Formula II.

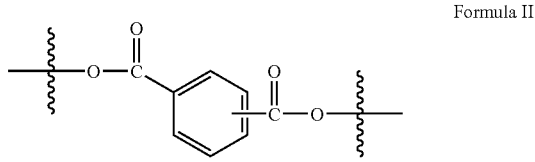

Formula II

Therefore, in one embodiment the present invention provides thermally stable polymers comprising resorcinol arylate polyester chain members as typically illustrated in Formula III wherein R and n are as previously defined:

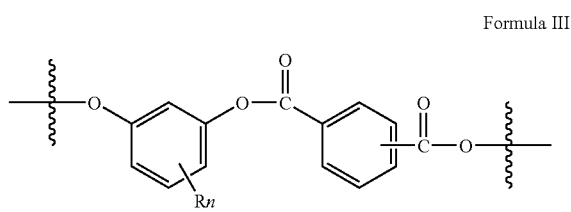

Formula III

In one of its aspects the present invention provides a composition made of a resin made using an interfacial polymerization method preparing of polymers comprising resorcinol arylate polyester chain members substantially free of anhydride linkages, said method comprising a first step of combining at least one resorcinol moiety and at least one catalyst in a mixture of water and at least one organic solvent substantially immiscible with water. Suitable resorcinol moieties comprise units of Formula IV:

Formula IV wherein R is at least one of $C_{1-12}$ alkyl, $C_6$-$C_{24}$ aryl, alkylaryl, alkoxy or halogen, and n is 0-4. Alkyl groups, if present, are typically straight-chain, branched, or cyclic alkyl groups, and are most often located in the ortho position to both oxygen atoms although other ring locations are contemplated. Suitable $C_{1-12}$ alkyl groups include, but are not limited to, methyl, ethyl, n-propyl, isopropyl, butyl, iso-butyl, t-butyl, hexyl, cyclohexyl, nonyl, decyl, and aryl-substituted alkyl, including benzyl. In a particular embodiment an alkyl group is methyl. Suitable halogen groups are bromo, chloro, and fluoro. The value for n in various embodiments may be 0-3, in some embodiments 0-2, and in still other embodiments 0-1.

In one embodiment a resorcinol moiety is 2-methylresorcinol. In another embodiment the resorcinol moiety is an unsubstituted resorcinol moiety in which n is zero. The method further comprises combining at least one catalyst with the reaction mixture. Said catalyst may be present in various embodiments at a total level of 0.01 to 10 mole %, and in some embodiments at a total level of 0.2 to 6 mole % based on total molar amount of acid chloride groups. Suitable catalysts comprise tertiary amines, quaternary ammonium salts, quaternary phosphonium salts, hexaalkylguanidinium salts, and mixtures thereof.

Suitable dicarboxylic acid dihalides may comprise aromatic dicarboxylic acid dichlorides derived from monocyclic moieties, illustrative examples of which include isophthaloyl dichloride, terephthaloyl dichloride, or mixtures of isophthaloyl and terephthaloyl dichlorides. Suitable dicarboxylic acid dihalides may also comprise aromatic dicarboxylic acid dichlorides derived from polycyclic moieties, illustrative examples of which include diphenyl dicarboxylic acid dichloride, diphenylether dicarboxylic acid dichloride, and naphthalenedicarboxylic acid dichloride, especially naphthalene-2,6-dicarboxylic acid dichloride; or from mixtures of monocyclic and polycyclic aromatic dicarboxylic acid dichlorides. In one embodiment the dicarboxylic acid dichloride comprises mixtures of isophthaloyl and/or terephthaloyl dichlorides as typically illustrated in Formula V.

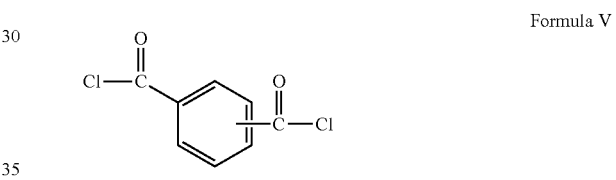

Formula V

Either or both of isophthaloyl and terephthaloyl dichlorides may be present. In some embodiments the dicarboxylic acid dichlorides comprise mixtures of isophthaloyl and terephthaloyl dichloride in a molar ratio of isophthaloyl to terephthaloyl of about 0.25-4.0:1; in other embodiments the molar ratio is about 0.4-2.5:1; and in still other embodiments the molar ratio is about 0.67-1.5:1.

Dicarboxylic acid halides provide only one method of preparing the polymers mentioned herein. Other routes to make the resorcinol arylate linkages are also contemplated using, for example, the dicarboxylic acid, a dicarboxylic acid ester, especially an activated ester, or dicarboxylate salts or partial salts.

At least one chain-stopper (also referred to sometimes hereinafter as capping agent) may also be present in the method and compositions of the invention. A purpose of adding at least one chain-stopper is to limit the molecular weight of polymer comprising resorcinol arylate polyester chain members, thus providing polymer with controlled molecular weight and favorable processability. Typically, at least one chain-stopper is added when the resorcinol arylate-containing polymer is not required to have reactive end-groups for further application. In the absence of chain-stopper resorcinol arylate-containing polymer may be either used in solution or recovered from solution for subsequent use such as in copolymer formation which may require the presence of reactive end-groups, typically hydroxy, on the resorcinol-arylate polyester segments. A chain-stopper may be at least one of mono-phenolic compounds, mono-carboxylic acid chlorides, and/or mono-chloroformates. Typically, the at least one chain-stopper may be present in quantities of 0.05 to 10 mole %, based on resorcinol moieties in the case of monophenolic compounds and based on acid dichlorides in the case of mono-carboxylic acid chlorides and/or mono-chloroformates.

Suitable mono-phenolic compounds include monocyclic phenols, such as phenol, $C_1$-$C_{22}$ alkyl-substituted phenols, p-cumyl-phenol, p-tertiary-butyl phenol, hydroxy diphenyl; monoethers of diphenols, such as p-methoxyphenol. Alkyl-substituted phenols include those with branched chain alkyl substituents having 8 to 9 carbon atoms as described in U.S. Pat. No. 4,334,053. In some embodiments mono-phenolic chain-stoppers are phenol, p-cumylphenol, and resorcinol monobenzoate.

Suitable mono-carboxylic acid chlorides include monocyclic, mono-carboxylic acid chlorides, such as benzoyl chloride, $C_1$-$C_{22}$ alkyl-substituted benzoyl chloride, toluoyl chloride, halogen-substituted benzoyl chloride, bromobenzoyl chloride, cinnamoyl chloride, 4-nadimidobenzoyl chloride, and mixtures thereof; polycyclic, mono-carboxylic acid chlorides, such as trimellitic anhydride chloride, and naphthoyl chloride; and mixtures of monocyclic and polycyclic mono-carboxylic acid chlorides. The chlorides of aliphatic mono-carboxylic acids with up to 22 carbon atoms are also suitable. Functionalized chlorides of aliphatic monocarboxylic acids, such as acryloyl chloride and methacryoyl chloride, are also suitable. Suitable mono-chloroformates include monocyclic, mono-chloroformates, such as phenyl chloroformate, alkyl-substituted phenyl chloroformate, p-cumyl phenyl chloroformate, toluene chloroformate, and mixtures thereof.

A chain-stopper can be combined together with the resorcinol moieties, can be contained in the solution of dicarboxylic acid dichlorides, or can be added to the reaction mixture after production of a precondensate. If mono-carboxylic acid chlorides and/or mono-chloroformates are used as chain-stoppers, they are often introduced together with dicarboxylic acid dichlorides. These chain-stoppers can also be added to the reaction mixture at a moment when the chlorides of dicarboxylic acid have already reacted substantially or to completion. If phenolic compounds are used as chain-stoppers, they can be added in one embodiment to the reaction mixture during the reaction, or, in, cyanuric acid another embodiment, before the beginning of the reaction between resorcinol moiety and acid chloride moiety. When hydroxy-terminated resorcinol arylate-containing precondensate or oligomers are prepared, then chain-stopper may be absent or only present in small amounts to aid control of oligomer molecular weight.

In another embodiment the invention may encompass the inclusion of at least one branching agent such as a trifunctional or higher finctional carboxylic acid chloride and/or trifunctional or higher finctional phenol. Such branching agents, if included, can typically be used in quantities of 0.005 to 1 mole %, based on dicarboxylic acid dichlorides or resorcinol moieties used, respectively. Suitable branching agents include, for example, trifunctional or higher carboxylic acid chlorides, such as trimesic acid tri acid chloride, 3,3',4,4'-benzophenone tetracarboxylic acid tetrachloride, 1,4,5,8-naphthalene tetracarboxylic acid tetrachloride or pyromellitic acid tetrachloride, and trifunctional or higher phenols, such as 4,6-dimethyl-2,4,6-tri-(4-hydroxyphenyl)-2-heptene, 4,6-dimethyl-2,4,6-tri-(4-hydroxyphenyl)-heptane, 1,3,5-tri-(4-hydroxyphenyl)-benzene, 1,1,1-tri-(4-hydroxyphenyl)-ethane, tri-(4-hydroxyphenyl)-phenyl methane, 2,2-bis-[4,4-bis-(4-hydroxyphenyl)-cyclohexyl]-propane, 2,4-bis-(4-hydroxyphenylisopropyl)-phenol, tetra-(4-hydroxyphenyl)-methane, 2,6-bis-(2-hydroxy-5-methyl-benzyl)-4-methyl phenol, 2-(4-hydroxyphenyl)-2-(2,4-dihydroxyphenyl)-propane, tetra-(4-[4-hydroxyphenylisopropyl]-phenoxy)-methane, 1,4-bis-[(4,4-dihydroxytriphenyl)methyl]-benzene. Phenolic branching agents may be introduced first with the resorcinol moieties while acid chloride branching agents may be introduced together with acid dichlorides.

In one of its embodiments the invention comprises thermally stable resorcinol arylate polyesters made by the present method and substantially free of anhydride linkages linking at least two mers of the polyester chain. In a particular embodiment said polyesters comprise dicarboxylic acid residues derived from a mixture of iso- and terephthalic acids as illustrated in Formula VI:

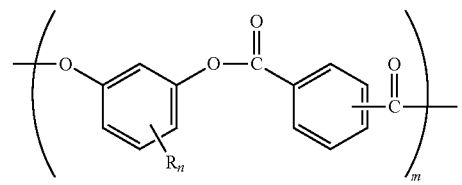

Formula VI wherein R is at least one of $C_{1-12}$ alkyl, $C_6$-$C_{24}$ aryl, alkyl aryl, alkoxy or halogen, n is 0-4, and m is at least about 5 or at least about 8. In various embodiments n is zero and m is between about 10 and about 300. The molar ratio of isophthalate to terephthalate is in one embodiment about 0.25-4.0:1, in another embodiment about 0.4-2.5:1, and in still another embodiment about 0.67-1.5:1. Substantially free of anhydride linkages means that said polyesters show decrease in molecular weight in one embodiment of less than 30% and in another embodiment of less than 10% upon heating said polymer at a temperature of about 280-290° C. for five minutes.

Also included in the scope of this invention are resorcinol arylate copolyesters containing soft-block segments as disclosed in commonly owned U.S. Pat. No. 5,916,997. The term soft-block as used herein, indicates that some segments of the polymers are made from non-aromatic monomer units. Such non-aromatic monomer units are generally aliphatic and are known to impart flexibility to the soft-block-containing polymers. The copolymers include those comprising structural units of Formulas I, VII, and VIII:

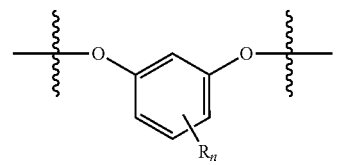

Formula I

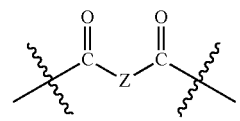

Formula VII

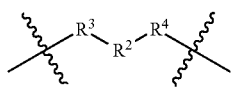

Formula VIII wherein R and n are as previously defined, Z is a divalent aromatic radical, $R^2$ is a $C_{3-20}$ straight chain alkylene, $C_{3-10}$ branched alkylene, or $C_{4-10}$ cyclo- or bicycloalkylene group, and $R^3$ and $R^4$ each independently represent

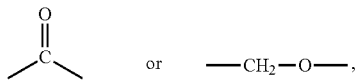

wherein Formula VIII contributes from about 1 to about 45 mole percent to the ester linkages of the polyester. Additional embodiments of the present invention provide a composition wherein Formula VIII contributes in various embodiments from about 5 to about 40 mole percent to the ester linkages of the polyester, and in other embodiments from about 5 to about 20 mole percent to the ester linkages of the polyester. Another embodiment provides a composition wherein $R^2$ represents in one embodiment $C_{3-14}$ straight chain alkylene, or $C_{5-6}$ cycloalkylene, and in another embodiment $R^2$ represents $C_{3-10}$ straight-chain alkylene or $C_6$-cycloalkylene. Formula VII represents an aromatic dicarboxylic acid residue. The divalent aromatic radical Z in Formula VII may be derived in various embodiments from at least one of the suitable dicarboxylic acid residues as defined hereinabove, and in some embodiments at least one of 1,3-phenylene, 1,4-phenylene, or 2,6-naphthylene. In various embodiments Z comprises at least about 40 mole percent 1,3-phenylene. In various embodiments of copolyesters containing soft-block chain members n in Formula I is zero.

In another of its embodiments the present invention comprises block copolyestercarbonates comprising resorcinol arylate-containing block segments in combination with organic carbonate block segments. The segments comprising resorcinol arylate chain members in such copolymers are substantially free of anhydride linkages. Substantially free of anhydride linkages means that the copolyestercarbonates show decrease in molecular weight in one embodiment of less than 10% and in another embodiment of less than 5% upon heating said copolyestercarbonate at a temperature of about 280-290° C. for five minutes. The block copolyestercarbonates include those comprising alternating arylate and organic carbonate blocks, typically as illustrated in Formula IX, wherein R and n are as previously defined, and $R^5$ is at least one divalent organic radical:

Formula IX

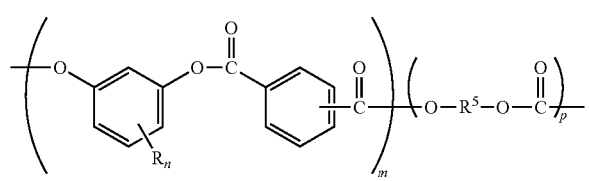

The arylate blocks have a degree of polymerization (DP), represented by m, in one embodiment of at least about 4, in another embodiment of at least about 10, in another embodiment of at least about 20 and in still another embodiment of about 30-150. The DP of the organic carbonate blocks, represented by p, is in one embodiment generally at least about 2, in another embodiment at least about 10-20 and in still another embodiment about 2-200. The distribution of the blocks may be such as to provide a copolymer having any desired weight proportion of arylate blocks in relation to carbonate blocks. In general, the content of arylate blocks is in one embodiment about 10-95% by weight and in another embodiment about 50-95% by weight.

Although a mixture of iso- and terephthalate is illustrated in Formula IX, the dicarboxylic acid residues in the arylate blocks may be derived from any suitable dicarboxylic acid residue, as defined hereinabove, or mixture of suitable dicarboxylic acid residues, including those derived from aliphatic diacid dichlorides (so-called "soft-block" segments). In various embodiments n is zero and the arylate blocks comprise dicarboxylic acid residues derived from a mixture of iso- and terephthalic acid residues, wherein the molar ratio of isophthalate to terephthalate is in one embodiment about 0.254.0:1, in another embodiment about 0.4-2.5:1, and in still another embodiment about 0.67-1.5:1.

In the organic carbonate blocks, each $R^5$ is independently a divalent organic radical. In various embodiments said radical comprises at least one dihydroxy-substituted aromatic hydrocarbon, and at least about 60 percent of the total number of $R^5$ groups in the polymer are aromatic organic radicals and the balance thereof are aliphatic, alicyclic, or aromatic radicals. Suitable $R^5$ radicals include m-phenylene, p-phenylene, 4,4'-biphenylene, 4,4'-bi(3,5-dimethyl)-phenylene, 2,2-bis(4-phenylene)propane, 6,6'-(3,3,3',3'-tetramethyl-1,1'-spirobi[1H-indan]) and similar radicals such as those which correspond to the dihydroxy-substituted aromatic hydrocarbons disclosed by name or formula (generic or specific) in U.S. Pat. No. 4,217,438.

In some embodiments each $R^5$ is an aromatic organic radical and in other embodiments a radical of Formula X:

Formula X

wherein each $A^1$ and $A^2$ is a monocyclic divalent aryl radical and Y is a bridging radical in which one or two carbon atoms separate $A^1$ and $A^2$. The free valence bonds in Formula X are usually in the meta or para positions of $A^1$ and $A^2$ in relation to Y. Compounds in which $R^5$ has Formula X are bisphenols, and for the sake of brevity the term "bisphenol" is sometimes used herein to designate the dihydroxy-substituted aromatic hydrocarbons. It should be understood, however, that non-bisphenol compounds of this type may also be employed as appropriate.

In Formula X, $A^1$ and $A^2$ typically represent unsubstituted phenylene or substituted derivatives thereof, illustrative substituents (one or more) being alkyl, alkenyl, and halogen (particularly bromine). In one embodiment unsubstituted phenylene radicals are preferred. Both $A^1$ and $A^2$ are often p-phenylene, although both may be o- or m-phenylene or one o- or m-phenylene and the other p-phenylene.

The bridging radical, Y, is one in which one or two atoms, separate $A^1$ from $A^2$. In a particular embodiment one atom separates $A^1$ from $A^2$. Illustrative radicals of this type are —O—, —S—, —SO— or —$SO_2$—, methylene, cyclohexyl methylene, 2-[2.2.1]-bicycloheptyl methylene, ethylene, isopropylidene, neopentylidene, cyclohexylidene, cyclopentadecylidene, cyclododecylidene, adamantylidene, and like radicals.

In some embodiments gem-alkylene (commonly known as "alkylidene") radicals are preferred. Also included, however, are unsaturated radicals. In some embodiments the preferred bisphenol is 2,2-bis(4-hydroxyphenyl)propane (bisphenol-A or BPA), in which Y is isopropylidene and $A^1$ and $A^2$ are each p-phenylene. Depending upon the molar excess of resorcinol moiety present in the reaction mixture, $R^5$ in the carbonate blocks may at least partially comprise resorcinol moiety. In other words, in some embodiments of the invention carbonate blocks of Formula X may comprise a resorcinol moiety in combination with at least one other dihydroxy-substituted aromatic hydrocarbon.

Diblock, triblock, and multiblock copolyestercarbonates are encompassed in the present invention. The chemical linkages between blocks comprising resorcinol arylate chain members and blocks comprising organic carbonate chain members may comprise at least one of (a) an ester linkage between a suitable dicarboxylic acid residue of an arylate moiety and an —O—$R^5$—O— moiety of an organic carbonate moiety, for example as typically illustrated in Formula XI, wherein $R^5$ is as previously defined:

Formula XI

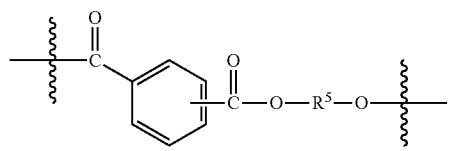

and (b) a carbonate linkage between a diphenol residue of a resorcinol arylate moiety and a —(C=O)—O— moiety of an organic carbonate moiety as shown in Formula XII, wherein R and n are as previously defined:

Formula XII

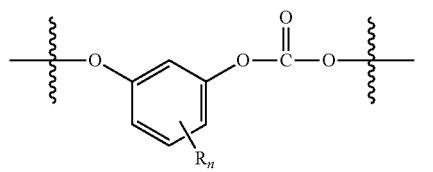

In one embodiment the copolyestercarbonate is substantially comprised of a diblock copolymer with a carbonate linkage between resorcinol arylate block and an organic carbonate block. In another embodiment the copolyestercarbonate is substantially comprised of a triblock carbonate-ester-carbonate copolymer with carbonate linkages between the resorcinol arylate block and organic carbonate end-blocks.

Copolyestercarbonates with at least one carbonate linkage between a thermally stable resorcinol arylate block and an organic carbonate block are typically prepared from resorcinol arylate-containing oligomers prepared by various embodiments of the invention and containing in one embodiment at least one and in another embodiment at least two hydroxy-terminal sites. Said oligomers typically have weight average molecular weight in one embodiment of about 10,000 to about 40,000, and in another embodiment of about 15,000 to about 30,000. Thermally stable copolyestercarbonates may be prepared by reacting said resorcinol arylate-containing oligomers with phosgene, at least one chain-stopper, and at least one dihydroxy-substituted aromatic hydrocarbon in the presence of a catalyst such as a tertiary amine.

In one instance a composition with improved flame retardance comprising a blend of a resin selected from the group consisting of: polysulfones, polyethersulfones and polyphenylene ether sulfones, and mixtures thereof, a silicone copolymer and a resorcinol based aryl polyester resin wherein greater than or equal to 50 mole % of the aryl polyester linkages are aryl ester linkages derived from resorcinol is contemplated.

In some instances polysulfones, polyethersulfones and polyphenylene ether sulfones and mixtures thereof, will have a hydrogen atom to carbon atom ratio (H/C) of less than or equal to about 0.85 are of note. Polymers with higher carbon content relative to hydrogen content, that is a low ratio of hydrogen to carbon atoms, often show improved FR performance. These polymers have lower fuel value and may give off less energy when burned. They may also resist burning through a tendency to form an insulating char layer between the polymeric fuel and the source of ignition. Independent of any specific mechanism or mode of action it has been observed that such polymers, with a low H/C ratio, have superior flame resistance. In some instances the H/C ratio can be less than or equal to 0.85. In other instances a H/C ratio of greater than about 0.4 is preferred in order to give polymeric structures with sufficient flexible linkages to achieve melt processability. The H/C ratio of a given polymer or copolymer can be determined from its chemical structure by a count of carbon and hydrogen atoms independent of any other atoms present in the chemical repeat unit.

In some cases the flame retardant polymer blends, and articles made from them, will have 2 minute heat release of less than about 60 kW-min/m². In other instances the peak heat release will be less than about 80 kW/m². A time to peak heat release of more than about 2 minute is also a beneficial aspect of certain compositions and articles made from them. In other instances a time to peak heat release of greater than about 3 minutes may be achieved.

In the flame retardant blends presented herein the polysulfones, polyethersulfones and polyphenylene ether sulfones and mixtures thereof may be present in amounts of about 1 to about 99 weight percent, based on the total weight of the composition. Within this range, the amount of the polysulfones, polyethersulfones and polyphenylene ether sulfones and mixtures thereof may be greater than or equal to about 20, more specifically greater than or equal to about 50, and even more specifically greater than or equal to about 70 weight percent.

In another embodiment a composition comprising a flame retardant polymer blend of;

a) 1-99% by weight of a polysulfones, polyethersulfones and polyphenylene ether sulfones and mixtures thereof, b) 99-1% by weight of an aryl polyester resin containing at least 50 mole % resorcinol derived linkages, c) 0.1-30% by weight of silicone copolymer d) 0-20% by weight of one or more metal oxides, is contemplated.

In other aspect a composition comprising a flame retardant polymer blend of;

a) 50-99% by weight of one or more polysulfones, polyethersulfones and polyphenylene ether sulfones resins, b) 1-50% by weight of one or more aryl polyester carbonate resins containing at least 50 mole % resorcinol derived linkages, c) 0.1-10% by weight of silicone copolymer
d) 0-20% by weight of one or more metal oxides, and
e) 0-2% by weight of one or more phosphorus containing stabilizers,
is contemplated.

The thermoplastic polysulfones, polyethersulfones and polyphenylene ether sulfones polyethersulfones may be prepared as described in U.S. Pat. Nos. 3,634,355, 4,008,203, 4,108,837 and 4,175,175.

Polyaryl ether sulfones, also referred to as polysulfones, polyether sulfones and polyphenylene ether sulfones are linear thermoplastic polymers that possess a number of attractive features such as high temperature resistance, good electrical properties, and good hydrolytic stability. A variety of polyaryl ether sulfones are commercially available, including the polycondensation product of dihydroxy diphenyl sulfone with dichloro diphenyl sulfone and known as polyether sulfone (PES) resin, and the polymer of bisphenol-A and dichloro diphenyl sulfone known in the art as polysulfone (PSu or PSF) resin.

Other polyaryl ether sulfones are the polybiphenyl ether sulfone resins, available from Solvay Inc. under the trademark of RADEL R resin. This resin may be described as the product of the polycondensation of biphenol with 4,4'-dichlorodiphenyl sulfone and also is known and described in the art, for example, in Canadian Patent No. 847,963.

Polysulfones are sold by Solvay Co. under the UDEL trade name. Polyethersulfones are sold by Solvay under the RADEL A trade names and by BASF Co, as ULTRASON E. A variety of PES copolymers, for example comprising bisphenol A (BPA) moieties, other bisphenols and diphenyl sulfone moieties in molar ratios other than 1:1, may also be found.

Methods for the preparation of polyaryl ether sulfones are widely known and several suitable processes have been well described in the art. Two methods, the carbonate method and the alkali metal hydroxide method, are known and used for this purpose. In the alkali metal hydroxide method, a double alkali metal salt of a dihydric phenol is contacted with a dihalobenzenoid compound in the presence of a dipolar, aprotic solvent under substantially anhydrous conditions. The carbonate method, in which at least one dihydric phenol and at least one dihalobenzenoid compound are heated, for example, with sodium carbonate or bicarbonate and a second alkali metal carbonate or bicarbonate is also disclosed in the art, for example in U.S. Pat. No. 4,176,222. Alternatively, the polybiphenyl ether sulfone, PSu and PES resin components may be prepared by any of the variety of methods known in the art for the preparation of polyaryl ether resins.

The molecular weight of the polysulfone, as indicated by reduced viscosity data in an appropriate solvent such as methylene chloride, chloroform, N-methylpyrrolidone, or the like, will be at least 0.3 dl/g, preferably at least 0.4 dl/g and, typically, will not exceed about 1.5 dl/g. In some instances the polysulfone weight average molecular weight can vary from 10,000 to 100,000. Polysulfone resins may have glass transition temperatures from 180 to 250 ° C. in some instances.

Polysulfone resins are further described in ASTM method D6394 Standard Specification for Sulfone Plastics.

Any siloxane copolymer can be used in effective amounts to improve the heat release performance of the composition. In some instances siloxane copolymers of polyetherimides, polyetherimide sulfones, polysulfones, polyphenylene ether sulfones, polyether sulfones or polyphenylene ethers maybe used. In other instances, polyetherimide, or polycarbonate siloxane containing copolymers maybe effective in reducing heat release and improving FR performance. Mixtures of different types of siloxane copolymers are also contemplated. Siloxane copolymers with from 20-50 wt % siloxane content are preferred in some instances.

The block length of the siloxane segment of the copolymer may be of any effective length. In some examples it may be of 2-50 siloxane repeating units. In other instances the siloxane block length it may be from 5-30 repeat units. In many instances dimethyl siloxanes may be used.

Siloxane polyetherimide copolymers are a specific embodiment of the siloxane copolymer that may be used in the blends of this invention. Examples of such siloxane polyetherimides are shown in U.S. Pat. Nos. 4,404,350, 4,808,686 and 4,690,997. In one instance polyetherimide siloxanes can be prepared in a manner similar to that used for polyetherimides, except that a portion, or all, of the organic diamine reactant is replaced by an amine-terminated organo siloxane, for example of the formula XIII wherein g is an integer from 1 to about 50, preferably from about 5 to about 30 and R' is an aryl, alkyl or aryl alky group of from 2 to 20 carbon atoms.

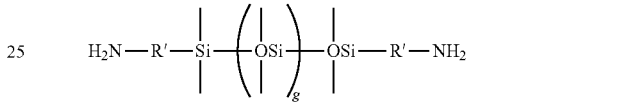

Formula XIII

The polyimide siloxane can be prepared by any of the methods well known to those skilled in the art, including the reaction of an aromatic bis(ether anhydride) of the formula (XIV)

Formula XIV wherein T is —O—, —S—, —SO$_2$— or a group of the formula —O-Z-O— wherein the divalent bonds of the —O— or the —O-Z-O— group are in the 3,3',3,4',4,3', or the 4,4' positions, and wherein Z includes, but is not limited to substituted or unsubstituted divalent organic radicals such as: (a) aromatic hydrocarbon radicals having about 6 to about 20 carbon atoms and halogenated derivatives thereof; (b) straight or branched chain alkylene radicals having about 2 to about 20 carbon atoms; (c) cycloalkylene radicals having about 3 to about 20 carbon atoms, or (d) divalent radicals of the general formula (XV)

Formula XV wherein Q includes but is not limited to a divalent moiety selected from the group consisting of —O—, —S—, —C(O)—, —SO$_2$—, —SO—, —C$_y$H$_{2y}$— (y being an integer from 1 to 8), and fluorinated derivatives thereof, including perfluoroalkylene groups, with an organic diamine of the formula (XVI)

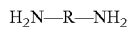
Formula XVI wherein the moiety R in formula (XVI) includes, but is not limited to, substituted or unsubstituted divalent organic radicals such as: (a) aromatic hydrocarbon radicals having about 6 to about 24 carbon atoms and halogenated derivatives thereof; (b) straight or branched chain alkylene radicals having about 2 to about 20 carbon atoms; (c) cycloalkylene radicals having about 3 to about 20 carbon atoms, or (d) divalent radicals of the general formula (XV).

Examples of specific aromatic bis anhydrides and organic diamines are disclosed, for example, in U.S. Pat. Nos. 3,972,902 and 4,455,410. Illustrative examples of aromatic bis anhydride of formula (XIV) include: 3,3-bis[4-(3,4-dicarboxyphenoxy)phenyl]propane dianhydride; 4,4'-bis(3,4-dicarboxyphenoxy)diphenyl ether dianhydride; 4,4'-bis(3,4-dicarboxyphenoxy)diphenyl sulfide dianhydride; 4,4'-bis(3,4-dicarboxyphenoxy)benzophenone dianhydride; 4,4'-bis(3,4-dicarboxyphenoxy)diphenyl sulfone dianhydride; 2,2-bis[4-(2,3-dicarboxyphenoxy)phenyl]propane dianhydride; 4,4'-bis(2,3-dicarboxyphenoxy)diphenyl ether dianhydride; 4,4'-bis(2,3-dicarboxyphenoxy)diphenyl sulfide dianhydride; 4,4'-bis(2,3-dicarboxyphenoxy)benzophenone dianhydride; 4,4'-bis(2,3-dicarboxyphenoxy)diphenyl sulfone dianhydride; 4-(2,3-dicarboxyphenoxy)-4'-(3,4-dicarboxyphenoxy)diphenyl-2,2-propane dianhydride; 4-(2,3-dicarboxyphenoxy)-4'-(3,4-dicarboxyphenoxy)diphenyl ether dianhydride; 4-(2,3-dicarboxyphenoxy)-4'-(3,4-dicarboxyphenoxy)diphenyl sulfide dianhydride; 4-(2,3-dicarboxyphenoxy)-4'-(3,4-dicarboxyphenoxy)benzophenone dianhydride and 4-(2,3-dicarboxyphenoxy)-4'-(3,4-dicarboxyphenoxy)diphenyl sulfone dianhydride, as well as various mixtures thereof.

Examples of suitable compounds are ethylenediamine, propylenediamine, trimethylenediamine, diethylenetriamine, triethylenetertramine, hexamethylenediamine, heptamethylenediamine, octamethylenediamine, nonamethylenediamine, decamethylenediamine, 1,12-dodecanediamine, 1,18-octadecanediamine, 3-methylheptamethylenediamine, 4,4-dimethylheptamethylenediamine, 4-methylnonamethylenediamine, 5-methylnonamethylenediamine, 2,5-dimethylhexamethylenediamine, 2,5-dimethylheptamethylenediamine, 2,2-dimethylpropylenediamine, N-methyl-bis(3-aminopropyl)amine, 3-methoxyhexamethylenediamine, 1,2-bis(3-aminopropoxy)ethane, bis(3-aminopropyl)sulfide, 1,4-cyclohexanediamine, bis-(4-aminocyclohexyl)methane, m-phenylenediamine, p-phenylenediamine, 2,4-diaminotoluene, 2,6-diaminotoluene, m-xylylenediamine, p-xylylenediamine, 2-methyl-4,6-diethyl-1,3-phenylene-diamine, 5-methyl-4,6-diethyl-1,3-phenylene-diamine, benzidine, 3,3'-dimethylbenzidine, 3,3'-dimethoxybenzidine, 1,5-diaminonaphthalene, bis(4-aminophenyl)methane, bis(2-chloro-4-amino-3,5-diethylphenyl)methane, bis(4-aminophenyl)propane, 2,4-bis(amino-t-butyl)toluene, bis(p-amino-t-butylphenyl)ether, bis(p-methyl-o-aminophenyl)benzene, bis(p-methyl-o-aminopentyl)benzene, 1,3-diamino-4-isopropylbenzene, bis(4-aminophenyl)sulfide, bis(4-aminophenyl)sulfone, bis(4-aminophenyl)ether and 1,3-bis(3-aminopropyl)tetramethyldisiloxane. Mixtures of these compounds may also be present. The preferred diamino compounds are aromatic diamines, especially m- and p-phenylenediamine, sulfonyl dianiline and mixtures thereof.

Some polyetherimde siloxanes may be formed by reaction of an organic diamine, or mixture of diamines, of formula XVI and the amine-terminated organo siloxane of formula XIII. The diamino components may be physically mixed prior to reaction with the bis-anhydride(s), thus forming a substantially random copolymer. Alternatively block or alternating copolymers may be formed by selective reaction of XVI and XIII with dianhydrides, for example those of formula XIV, to make polyimide blocks that are subsequently reacted together. In another instance the siloxane used to prepare the polyetherimde copolymer may have anhydride rather than amine functional end groups.

In one instance the siloxane polyetherimide copolymer can be of formula XVII wherein T, R' and g are described as above, n is from 5-100 and Ar is an aryl or alkyl aryl group of from 6 to 36 carbons.

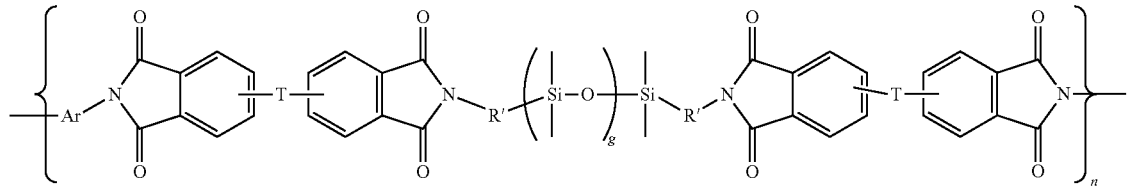
Formula XVII

In some siloxane polyetherimides the diamine component of the siloxane polyetherimide copolymers may contain from about 20 to 50 mole % of the amine-terminated organo siloxane of formula XIII and from about 50 to 80 mole % of the organic diamine of formula XVI. In some siloxane copolymers, the siloxane component is derived from about 25 to about 40 mole % of an amine or anhydride terminated organo siloxane, for example as described in U.S. Pat. No. 4,404,350.

The high flexural modulus and high tensile elongation of the compositions make them useful for applications, such as sheets, where they show resistance to damage by impact and also show sufficient stiffness so that they will not flex or bend under load. The combination of toughness, shown in high elongation at break, stiffness, as shown in a high flexural modulus and flame resistance, as shown in a low heat release values, make sheets or other articles formed from these compositions very useful. For example such sheets can be used for the construction of vehicles for transportation, for instance aircraft or train interiors. They can also be used in building and construction. Sheets can be used as prepared, for example by extrusion, compression molding or calendering and can be thermoformed or shaped by other methods. Films and sheets can also be components in more complex multilayer constructions. Good impact is shown, in some instances by having a tensile elongation at break, for example, as measured by ASTM method D638, of greater than or equal to about 50%. High stiffness is shown in other instances by having a flexural modulus, for examples as measured by ASTM method D790, of greater than or equal to about 300 Kpsi (2070 Mpa).

In some cases a metal oxide may be added to the blends of polysulfone, polyether sulfone or polyphenylene ether sulfone siloxane copolymer and resorcinol ester containing polymer. In some instances the metal oxide may further improve flame resistance (FR) performance by decreasing heat release and increasing the time to peak heat release. Titanium dioxide is of note. Other metal oxides include zinc oxides, boron oxides, antimony oxides, iron oxides and transition metal oxides. Metal oxides that are white may be desired in some instances. Metal oxides may be used alone or in combination with other metal oxides. Metal oxides may be used in any effective amount, in some instances at from 0.01 to 20 wt % of the polymer blend.

Other useful additives include smoke suppressants such as metal borate salts for example zinc borate, alkali metal or alkaline earth metal borate or other borate salts. Additionally other boron containing compounds, such as boric acid, borate esters, boron oxides or other oxygen compounds of boron may be useful. Additionally other flame retardant additives, such as aryl phosphates, sulfonate salts and brominated aromatic compounds, including polymers containing linkages made from brominated aryl compounds, may be employed. Mixtures of any or all of these flame retardants may also be used. Examples of halogenated aromatic compounds, are brominated phenoxy resins, halogenated polystyrenes, halogenated imides, brominated polycarbonates, brominated epoxy resins and mixtures thereof. Examples of sulfonate salts are potassium perfluoro butyl sulfonate, sodium tosylate, sodium benzene sulfonate, sodium dichloro phenyl benzene sulfonate, potassium diphenyl sulfone sulfonate and sodium methane sulfonate and mixture thereof. In some instances sulfonate salts of alkaline and alkaline earth metals are preferred. Examples of phosphate flame retardants are tri aryl phosphates, tri cresyl phosphate, triphenyl phosphate, bisphenol A phenyl diphosphates, resorcinol phenyl diphosphates, phenyl-bis-(3,5,5'-trimethylhexyl phosphate), ethyl diphenyl phosphate, bis(2-ethylhexyl)-p-tolyl phosphate, bis (2-ethylhexyl)-phenyl phosphate, tri(nonylphenyl)phosphate, phenyl methyl hydrogen phosphate, di(dodecyl)-p-tolyl phosphate, halogenated triphenyl phosphates, dibutyl phenyl phosphate, 2-chloroethyldiphenyl phosphate, p-tolyl bis(2,5,5'-trimethylhexyl)phosphate, 2-ethylhexyldiphenyl phosphate, diphenyl hydrogen phosphate, resorcinol diphosphate and the like as well as mixtures containing any of the above.

In some instances it maybe desired to have flame retardant compositions that are essentially free of halogen atoms, especially bromine and chlorine. Essentially free of halogen atoms means that in some embodiments the composition has less than about 3% halogen by weight of the composition and in other embodiments less than about 1% by weight of the composition containing halogen atoms. The amount of halogen atoms can be determined by ordinary chemical analysis.

The composition may also optionally include a fluoropolymer in any effective amount to provide anti-drip or other beneficial properties to the resin composition. f. In one instance the fluoro polymer may be used from 0.01 to about 5.0% fluoropolymer by weight of the composition. Some possible examples of suitable fluoropolymers and methods for making such fluoropolymers are set forth, for example, in U.S. Pat. Nos. 3,671,487, 3,723,373 and 3,383,092. Suitable fluoropolymers include homopolymers and copolymers that comprise structural units derived from one or more fluorinated alpha-olefin monomers. The term "fluorinated alpha-olefin monomer" means an alpha-olefin monomer that includes at least one fluorine atom substituent. Some of the suitable fluorinated alpha-olefin monomers include, for example, fluoro ethylenes such as, for example, $CF_2=CF_2$, $CHF=CF_2$, $CH_2=CF_2$ and $CH_2=CHF$ and fluoro propylenes such as, for example, $CF_3CF=CF_2$, $CF_3CF=CHF$, $CF_3CH=CF_2$, $CF_3CH=CH_2$, $CF_3CF=CHF$, $CHF_2CH=CHF$ and $CF_3CF=CH_2$.

Some of the suitable fluorinated alpha-olefin copolymers include copolymers comprising structural units derived from two or more fluorinated alpha-olefin monomers such as, for example, poly(tetrafluoro ethylene-hexafluoro ethylene), and copolymers comprising structural units derived from one or more fluorinated monomers and one or more non-fluorinated monoethylenically unsaturated monomers that are copolymerizable with the fluorinated monomers such as, for example, poly(tetrafluoroethylene-ethylene-propylene) copolymers. Suitable non-fluorinated monoethylenically unsaturated monomers include for example, alpha-olefin monomers such as, for example, ethylene, propylene, butene, acrylate monomers such as for example, methyl methacrylate, butyl acrylate, and the like, with poly(tetrafluoroethylene) homopolymer (PTFE) preferred.

The blends may further contain fillers and reinforcements for example fiber glass, milled glass, glass beads, flake and the like. Minerals such as talc, wollastonite, mica, kaolin or montmorillonite clay, silica, quartz and barite may be added. The compositions can also be modified with effective amounts of inorganic fillers, such as, for example, carbon fibers and nanotubes, metal fibers, metal powders, conductive carbon, and other additives including nano-scale reinforcements.

Other additives include, antioxidants such as phosphites, phosphonites and hindered phenols. Phosphorus containing stabilizers including triaryl phosphite and aryl phosphonates are of note as useful additives. Difunctional phosphorus containing compounds can also be employed. Stabilizers with a molecular weight of greater than or equal to about 300 are preferred. In other instances phosphorus containing stabilizers with a molecular weight of greater than or equal to 500 are useful. Phosphorus containing stabilizers are typically present in the composition at 0.05-0.5% by weight of the formulation. Colorants as well as light stabilizers and UV absorbers may also be present in the blend. Flow aids and mold release compounds are also contemplated. Examples of mold release agents are alkyl carboxylic acid esters, for example, penta erythritol tetrastearate, glycerin tristearate and ethylene glycol distearate. Mold release agents are typically present in the composition at 0.05-0.5% by weight of the formulation. Preferred mold release agents will have high molecular weight, typically greater than about 300, to prevent loss of the release agent from the molten polymer mixture during melt processing.

The compositions of the present invention can be blended with the aforementioned ingredients by a variety of methods involving intimate admixing of the materials with any additional additives desired in the formulation. A preferred procedure includes melt blending, although solution blending is also possible. Because of the availability of melt blending equipment in commercial polymer processing facilities, melt processing methods are generally preferred. Illustrative examples of equipment used in such melt processing methods include: co-rotating and counter-rotating extruders, single screw extruders, co-kneaders, disc-pack processors and various other types of extrusion equipment. The temperature of the melt in the present process is preferably minimized in order to avoid excessive degradation of the resins. It is often desirable to maintain the melt temperature between about 250° C. and about 370° C. in the molten resin composition, although higher temperatures can be used provided that the residence time of the resin in the processing equipment is kept short. In some embodiments the melt processed composition exits processing equipment such as an extruder through small exit holes in a die, and the resulting strands of molten resin are cooled by passing the strands through a water bath. The cooled strands can be chopped into small pellets for packaging, further handling and processing.

The compositions of the invention can be formed into articles by any number of methods. Preferred methods include, for example, injection molding, blow molding, compression molding, profile extrusion, sheet or film extrusion, gas assist molding, structural foam molding and thermoforming. Examples of such articles include, but are not limited to, cookware, food service items, medical devices, trays, plates, handles, helmets, animal cages, electrical connectors, enclosures for electrical equipment, engine parts, automotive engine parts, lighting sockets and reflectors, electric motor parts, power distribution equipment, communication equipment, computers and the like, including devices that have molded in snap fit connectors. The resorcinol polyarylate based blends described herein resins can also be made into film and sheet as well as components of laminate systems. Other articles include, for example, fibers, sheets, films, multilayer sheets, multilayer films, molded parts, extruded profiles, coated parts and foams: windows, luggage racks, wall panels, chair parts, lighting panels, diffusers, shades, partitions, lenses, skylights, lighting devices, reflectors, ductwork, cable trays, conduits, pipes, cable ties, wire coatings, electrical connectors, air handling devices, ventilators, louvers, insulation, bins, storage containers, doors, hinges, handles, sinks, mirror housing, mirrors, toilet seats, hangers, coat hooks, shelving, ladders, hand rails, steps, carts, trays, cookware, food service equipment, communications equipment and instrument panels.

Compositions discussed herein may be converted to articles using common thermoplastic processes such as film and sheet extrusion, Film and sheet extrusion processes may include and are not limited to melt casting, blown film extrusion and calendering. Co-extrusion and lamination processes may be employed to form composite multi-layer films or sheets. Single or multiple layers of coatings may further be applied to the single or multi-layer substrates to impart additional properties such as scratch resistance, ultra violet light resistance, aesthetic appeal, etc. Coatings may be applied through standard application techniques such as rolling, spraying, dipping, brushing, or flow coating. Film and sheet may alternatively be prepared by casting a solution or suspension of the composition in a suitable solvent onto a substrate, belt or roll followed by removal of the solvent. Films may also be metallized using standard processes such as sputtering, vacuum deposition and lamination with foil.

Oriented films may be prepared through blown film extrusion or by stretching cast or calendered films in the vicinity of the thermal deformation temperature using conventional stretching techniques. For instance, a radial stretching pantograph may be employed for multi-axial simultaneous stretching; an x-y direction stretching pantograph can be used to simultaneously or sequentially stretch in the planar x-y directions. Equipment with sequential uniaxial stretching sections can also be used to achieve uniaxial and biaxial stretching, such as a machine equipped with a section of differential speed rolls for stretching in the machine direction and a tenter frame section for stretching in the transverse direction.

Compositions discussed herein may be converted to multiwall sheet comprising a first sheet having a first side and a second side, wherein the first sheet comprises a thermoplastic polymer, and wherein the first side of the first sheet is disposed upon a first side of a plurality of ribs; and a second sheet having a first side and a second side, wherein the second sheet comprises a thermoplastic polymer, wherein the first side of the second sheet is disposed upon a second side of the plurality of ribs, and wherein the first side of the plurality of ribs is opposed to the second side of the plurality of ribs.

The films and sheets described above may further be thermoplastically processed into shaped articles via forming and molding processes including but not limited to thermoforming, vacuum forming, pressure forming, injection molding and compression molding. Multi-layered shaped articles may also be formed by injection molding a thermoplastic resin onto a single or multi-layer film or sheet substrate as described below:

1) Providing a single or multi-layer thermoplastic substrate having optionally one or more colors on the surface, for instance, using screen printing of a transfer dye.

2) Conforming the substrate to a mold configuration such as by forming and trimming a substrate into a three dimensional shape and fitting the substrate into a mold having a surface which matches the three dimensional shape of the substrate.

3) Injecting a thermoplastic resin into the mold cavity behind the substrate to (i) produce a one-piece permanently bonded three-dimensional product or (ii) transfer a pattern or aesthetic effect from a printed substrate to the injected resin and remove the printed substrate, thus imparting the aesthetic effect to the molded resin.

Those skilled in the art will also appreciate that common curing and surface modification processes including and not limited to heat-setting, texturing, embossing, corona treatment, flame treatment, plasma treatment and vacuum deposition may further be applied to the above articles to alter surface appearances and impart additional functionalities to the articles.

Accordingly, another embodiment of the invention relates to articles, sheets and films prepared from the compositions above.

Without further elaboration, it is believed that one skilled in the art can, using the description herein, utilize the present invention. The following examples are included to provide addition guidance to those skilled in the art of practicing the claimed invention. The examples provided are merely representative of the work and contribute to the teaching of the present invention. Accordingly, these examples are not intended to limit the invention in any manner.

All patents cited herein are incorporated by reference.

EXAMPLES OF THE INVENTION

Blends were prepared by extrusion of mixtures of resorcinol based polyester carbonate resin with polysulfone or polyether sulfone and a silicone polyimide copolymer resin in a 2.5 inch single screw, vacuum vented extruder. Compositions are listed in wt % of the total composition except where noted otherwise. The extruder was set at about 285 to 340° C. The blends were run at about 90 rpm under vacuum. The extrudate was cooled, pelletized and dried at 120° C. Test samples were injection molded at a set temperature of 320-360° C. and mold temperature of 120° C. using a 30 sec. cycle time.

Properties were measured using ASTM test methods. Melt flow rate (MFR) was run on dried pellets as per ASTM D1238 at 295° C. using a 6.7 Kg weight. All molded samples were conditioned for at least 48 h at 50% relative humidity prior to testing. Notched Izod impact values were measured at room temperature on 3.2 mm thick bars as per ASTM D256. Heat distortion temperature (HDT) was measured at 1.82 MPa (264 psi) on 3.2 mm thick bars as per ASTM D648. Tensile properties were measured on 3.2 mm type I bars as per ASTM method D638. Flexural properties were measured on 3.2 mm bars as per ASTM method D790.

Heat release testing was done on 15.2×15.2 cm plaques 2.0 mm thick using the Ohio State University (OSU) rate-of-heat release apparatus, as measured by the method listed in FAR 25.853. Heat release was measured at two-minutes in kW-min/m$^2$ (kilowatt minutes per square meter). The peak heat release was measured as kW/m2 (Kilowatt per square meter). The time to maximum heat release, in minutes, was also measured. The heat release test method is also described in the "Aircraft Materials Fire Test Handbook" DOT/FAA/AR-00/12, Chapter 5 "Heat Release Test for Cabin Materials".

Note that letters designate comparative examples while numbers designate examples of the invention.

Materials

Resorcinol ester polycarbonate (ITR) resin used in these examples is a polymer made from the condensation of a 1:1 mixture of iso and terephthaloyl chloride with resorcinol, bisphenol A (BPA) and phosgene. The ITR polymers are named by the approximate mole ratio of ester linkages to carbonate linkages. ITR9010 had about 82 mole % resorcinol ester linkages, 8 mole % resorcinol carbonate linkages and about 10 mole % BPA carbonate linkages. Tg=131° C.

PEI-Siloxane is a polyetherimide dimethyl siloxane copolymer made from the imidization reaction of m-phenylene diamine, BPA-dianhydride and a bis-aminopropyl functional methyl silicone containing on average about 10 silicone atoms. It has about 34 wt % siloxane content and a Mn of about 24,000 as measured by gel permeation chromatography.

PSu is a polysulfone made from reaction of bisphenol A and dichloro diphenyl sulfone, and is sold as UDEL1700 form Solvay Co PES is a polyether sulfone made from reaction of dihydroxy phenyl sulfone and dichloro diphenyl sulfone, and is sold as ULTRASON E from BASF Co.

Note that all blends had 3 parts per hundred (phr) titanium dioxide (TiO$_2$) added during compounding.

Examples 1 & 2

Example 1 of Table 1 shows a blend of a resorcinol ester polycarbonate (ITR9010), a polysulfone (PSu), and a silicone-polyimide copolymer (PEI-siloxane), that gives a surprising reduction in two-minute and peak heat release compared to the PSu control example A. The two-minute heat release is reduced from 63 to 47 kW-min/m$^2$. Peak heat release is also reduced from 120 to 75 kW/m$^2$. The time to peak heat release is also increased from 2.56 to 3.72 minutes, delaying the time at which the heat release reached maximum intensity. Note that addition of the resorcinol ester polycarbonate also increases flow (MFR=melt flow rate g/10 min, measured at 295° C.) from 6.7 to 13.8 g/10 min.

Example 2 shows a blend of a polysulfone with a polyethersulfone (PES) with ITR9010 and silicone polyimide that also has improved heat release properties and improved flow compared to the control example A.

TABLE 1

| | Examples * | | |
|---|---|---|---|
| | 1 | 2 | A |
| PSu | 62.5 | 31.25 | 100 |
| PES | 0 | 31.25 | 0 |
| PEI Siloxane | 2.5 | 2.5 | 0 |
| ITR9010 | 35 | 35 | 0 |
| Heat Release | | | |
| 2 min (kW-min/m$^2$) | 47 | 57 | 63 |
| Peak (kW/m$^2$) | 75 | 75 | 120 |
| Time to Peak (Min) | 3.72 | 2.91 | 2.56 |
| Appearance | foamy char | foamy char | char |
| MFR@295° C. g/10 min | 13.8 | 11.9 | 6.7 |

* blends had 3 phr TiO2

Example 3

Table 2, example 3, shows a polyethersulfone (PES) blend with a resorcinol ester polycarbonate (ITR9010) and 2.5 wt % of a silicone polyimide copolymer. In this case the control example B gives low heat release values but it fails the test due to burn through. The control PES sample has melted away from the flame and no longer provides a barrier to give fire protection. In contrast example 3, when burned according to the FAR/OSU test, produces a foamy char acting as barrier to flame spread. It also has low heat release values a longer time to peak heat release acting as a more efficient barrier to flame spread. Note that addition of the resorcinol ester PC (ITR9010) improves melt flow compared to the control example B.

TABLE 2

| | Examples * | |
|---|---|---|
| | 3 | B |
| PES | 62.5 | 100 |
| PEI Siloxane | 2.5 | 0 |
| ITR9010 | 35 | 0 |
| Heat Release | | |
| 2 min (kW-min/m$^2$) | 31 | 17 |
| Peak (kW/m$^2$) | 65 | 61 |
| Time to Peak (Min) | 3.74 | 2.18 |
| Appearance | foamy char | burn thru |
| MFR@295° C. g/10 min | 10.9 | 2.7 |

* blends had 3 phr TiO2

Examples 4 & 5

Examples 4 & 5 in table 3 show blends of PSu or PES with a higher content (60 wt %) of the resorcinol ester polycarbonate copolymer. The blends show low two-minute and low peak heat release values. When burned the samples develop a foamy char that acts as a barrier to flame spread. Examples 3 & 4 also show high melt flow, which is surprising in that they do not burn through or flow away from the flame during the FAR/OSU test.

The blends also show high flexural modulus ($\geq$300 Kpsi or 2070 MPa) and high flex strength ($\geq$15 Kpsi or 103.5 Mpa) as well as high ($\geq$50%) elongation at break.

TABLE 3

| | Examples * | |
|---|---|---|
| | 4 | 5 |
| PSu | 37.5 | 0 |
| PES | 0 | 37.5 |
| PEI Siloxane | 2.5 | 2.5 |
| ITR9010 | 60 | 60 |
| Heat Release | | |
| 2 min (kW-min/m$^2$) | 59 | 39 |
| Peak (kW/m$^2$) | 70 | 58 |
| Time to Peak (Min) | 2.65 | 2.40 |
| Appearance | foamy char | foamy char |
| MFR@295° C. g/10 min | 17.7 | 13.9 |
| Flex Mod Kpsi | 382 | 399 |
| Flex Str Kpsi | 17.6 | 18.3 |
| T Str. (Y) Kpsi | 11.0 | 11.7 |
| T. Mod. Kpsi | 372 | 383 |
| % Elong (B) | 89 | 110 |
| HDT 264 psi ° C. | 134 | 132 |
| N Izod ft-lbs/in | 2.6 | 3.5 |

* blends had 3 phr TiO2

The invention claimed is:

1. A composition with a two-minute peak heat release, as measured by FAR 25.853, of less than about 80 kW-min/m$^2$, the composition comprising a blend of:
  a) 1 to 99 wt. % of a first resin selected from the group consisting of: polysulfones, polyether sulfones, polyphenylene ether sulfones, and mixtures thereof;
  b) 0.1 to 10 wt. % of a second resin comprising a silicone copolymer selected from the group consisting of polyimide siloxanes, polyetherimide siloxanes, polyetherimide sulfone siloxanes, polycarbonate siloxanes, polyestercarbonate siloxanes, polysulfone siloxanes, polyether sulfone siloxanes, polyphenylene ether sulfone siloxanes and mixtures thereof;
  c) 1 to 99 wt. % of a third resin comprising a resorcinol based aryl polyester resin wherein greater than or equal to 50 mole % of the aryl polyester linkages are aryl ester linkages derived from resorcinol,
  wherein the resorcinol based aryl polyester has the structure shown below:

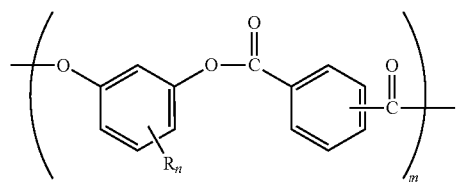

wherein R is at least one of $C_{1-12}$ alkyl, $C_6$-$C_{24}$ aryl, alkyl aryl or alkoxy, n is 0 to 4 and m is at least about 8, or,

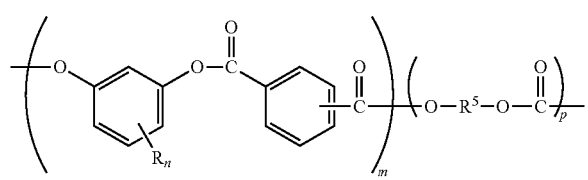

wherein R is at least one of $C_{1-12}$ alkyl, $C_6$-$C_{24}$ aryl, alkyl aryl or alkoxy, n is 0 to 4, $R^5$ is at least one divalent organic radical, m is about 4 to 150 and p is about 2-200, wherein the resorcinol based polyester is substantially free of anhydride linkages, wherein the resorcinol based polyester is essentially free of bromine and chlorine d) 0.05 to 2.0 wt % of one or more phosphorus containing stabilizers, selected from the group consisting of phosphites, phosphinates and mixtures thereof, each with a molecular weight above 500 Daltons, and e) 0.01 to 20% by weight of titanium dioxide.

2. The composition of claim 1 wherein the silicone copolymer has from 20-50 wt % siloxane content.

3. The composition of claim 1 wherein the polysulfones, polyether sulfones, polyphenylene ether sulfones and mixtures thereof, have a hydrogen atom to carbon atom ratio of less than or equal to 0.85.

4. The composition of claim 1, further comprising one or more metal oxides at 0.1 to 20% by weight of the polymer blend.

5. The composition of claim 1 wherein $R^5$ is derived from a bisphenol compound.

6. The composition of claim 1, comprising
  50-99% by weight of the first resin, and
  1-50% by weight of the third resin.

7. The composition of claim 1 further comprising a fluoropolymer.

8. The composition of claim 1 further comprising a compound containing at least one boron atom.

9. The composition of claim 1 which has a two-minute peak heat release, as measured by FAR 25.853, of less than about 60 kW-min/m$^2$.

10. The composition of claim 1 wherein the blend has a tensile elongation at break, as measured by ASTM D638, of greater than or equal to about 50%.

11. The composition of claim 1 wherein the blend has a flexural modulus, as measured by ASTM D790, of greater than or equal to about 300 Kpsi (2070 Mpa).

12. An article selected from the group consisting of sheets having one or more layers, films having one or more layers, molded parts, extruded profiles, coated parts, fibers and foams, which has a two-minute peak heat release, as measured by FAR 25.853 of less than about 80 kW-min/m$^2$, comprising a blend of:
  a) 1 to 99 wt. % of a first resin selected from the group consisting of: polysulfones, polyether sulfones, polyphenylene ether sulfones, and mixtures thereof,
  b) 0.1 to 10 wt. % of a second resin comprising a silicone copolymer selected from the group consisting of polyimide siloxanes, polyetherimide siloxanes, polyetherimide sulfone siloxanes, polycarbonate siloxanes, polyestercarbonate siloxanes, polysulfone siloxanes, polyether sulfone siloxanes, polyphenylene ether sulfone siloxanes and mixtures thereof,
  c) 1 to 99 wt. % of a third resin comprising a resorcinol based aryl polyester resin wherein greater than or equal to 50 mole % of the aryl polyester linkages are aryl ester linkages derived from resorcinol, wherein the resorcinol based aryl polyester has the structure shown below:

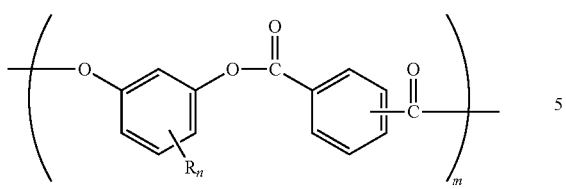

wherein R is at least one of $C_{1-12}$ alkyl, $C_6$-$C_{24}$ aryl, alkyl aryl or alkoxy, n is 0 to 4 and m is at least about 8, or,

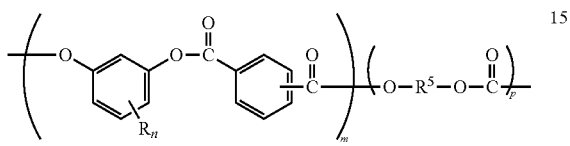

wherein R is at least one of $C_{1-12}$ alkyl, $C_6$-$C_{24}$ aryl, alkyl aryl or alkoxy, n is 0 to 4, $R^5$ is at least one divalent organic radical, m is about 4 to 150 and p is about 2-200, wherein the resorcinol based polyester is substantially free of anhydride linkages, wherein the resorcinol based polyester is essentially free of bromine and chlorine; and d) 0.05 to 2.0 wt % of one or more phosphorus containing stabilizers, selected from the group consisting of phosphites, phosphinates and mixtures thereof, each with a molecular weight above 500 Daltons, and e) 0.01 to 20% by weight of titanium dioxide.

* * * * *